(12) United States Patent
Frère et al.

(10) Patent No.: US 11,300,248 B2
(45) Date of Patent: Apr. 12, 2022

(54) DEVICE AND PROCESS FOR FILLING A MOBILE REFRIGERANT TANK WITH A CRYOGENIC REFRIGERANT

(71) Applicants: Messer SE & Co. KGaA, Bad Soden (DE); Messer France S.A.S., Suresnes (FR)

(72) Inventors: Émilien Frère, Meaux (FR); Frank Gockel, Velbert (DE)

(73) Assignees: Messer SE & Co. KGaA, Bad Soden (DE); Messer France S.A.S., Suresnes (FR)

( * ) Notice: Subject to any disclaimer, the term of this patent is extended or adjusted under 35 U.S.C. 154(b) by 155 days.

(21) Appl. No.: 16/641,554

(22) PCT Filed: Aug. 6, 2018

(86) PCT No.: PCT/EP2018/071282
§ 371 (c)(1),
(2) Date: Feb. 24, 2020

(87) PCT Pub. No.: WO2019/042714
PCT Pub. Date: Mar. 7, 2019

(65) Prior Publication Data
US 2020/0224824 A1 Jul. 16, 2020

(30) Foreign Application Priority Data

Aug. 31, 2017 (DE) .......................... 102017008210.3

(51) Int. Cl.
*F17C 5/02* (2006.01)
(52) U.S. Cl.
CPC .......... *F17C 5/02* (2013.01); *F17C 2221/012* (2013.01); *F17C 2221/014* (2013.01);
(Continued)

(58) Field of Classification Search
CPC .................. F17C 5/02; F17C 2221/012; F17C 2221/014; F17C 2221/032;
(Continued)

(56) References Cited

U.S. PATENT DOCUMENTS 3,191,395 A * 6/1965 Maher .................. F17C 13/126
62/47.1
3,946,572 A * 3/1976 Bragg ...................... F17C 5/02
62/50.1
(Continued)

FOREIGN PATENT DOCUMENTS

DE 19704362 C1 1/1998
EP 1353112 A1 10/2003
(Continued)

OTHER PUBLICATIONS

International Search Report and Written Opinion issued in corresponding PCT Application No. PCT/EP2018/071282, dated Nov. 20, 2018.

*Primary Examiner* — Timothy L Maust
*Assistant Examiner* — James R Hakomaki
(74) *Attorney, Agent, or Firm* — Andrus Intellectual Property Law, LLP

(57) ABSTRACT

In a tank filling process for filling a refrigerant tank of a vehicle with a cryogenic refrigerant, firstly a liquefied cryogenic refrigerant stored at a pressure p1 in a storage tank is supplied to a conditioning vessel, subsequently the flow connection between storage tank and conditioning vessel is interrupted, and the pressure in the conditioning vessel is increased, for example by virtue of a flow connection to a pressure build-up vessel being produced, to a pressure p2, wherein p2>p1, whereby the liquefied refrigerant is present in the conditioning vessel in the supercooled state. Subsequently, the supercooled, liquefied refrigerant is supplied to the tank to be filled. By means of the device according to the (Continued)

invention and the process according to the invention, evaporation losses during the filling process can be substantially avoided.

16 Claims, 1 Drawing Sheet

(52) U.S. Cl.
CPC .............. *F17C 2221/032* (2013.01); *F17C 2223/0161* (2013.01); *F17C 2223/033* (2013.01); *F17C 2270/0168* (2013.01)

(58) Field of Classification Search
CPC ........ F17C 2223/0161; F17C 2223/033; F17C 2250/043; F17C 2270/0168
USPC ......................................................... 62/50.1
See application file for complete search history.

(56) References Cited

U.S. PATENT DOCUMENTS

| | | | | |
|---|---|---|---|---|
| 4,175,395 A * | 11/1979 | Prost | ............... | F17C 9/02 62/50.2 |
| 5,121,609 A * | 6/1992 | Cieslukowski | ........... | F17C 7/02 123/525 |
| 5,360,139 A * | 11/1994 | Goode | ................ | F17C 5/007 141/18 |
| 5,421,160 A * | 6/1995 | Gustafson | ............. | F17C 5/007 123/525 |
| 5,590,535 A * | 1/1997 | Rhoades | ................. | F17C 9/02 62/50.2 |
| 5,937,655 A * | 8/1999 | Weiler | .................. | F17C 7/04 62/50.1 |
| 6,474,101 B1 * | 11/2002 | Quine | ..................... | F17C 7/04 62/50.2 |
| 6,786,053 B2 * | 9/2004 | Drube | ..................... | F17C 5/06 62/50.2 |
| 8,291,944 B2 * | 10/2012 | Allidieres | ............... | F17C 9/00 141/60 |
| 9,546,645 B2 * | 1/2017 | Allidieres | ............... | F04B 23/02 |
| 9,863,370 B2 * | 1/2018 | Jansson | .................. | F01N 5/02 |
| 10,704,735 B2 * | 7/2020 | Fauvel | .................... | F17C 5/02 |
| 2008/0078188 A1 * | 4/2008 | Matheoud | ............. | F17C 5/02 62/50.1 |
| 2012/0102978 A1 * | 5/2012 | Lee | ........................ | F17C 7/02 62/50.1 |
| 2012/0144846 A1 * | 6/2012 | Johanson | ................ | F17C 5/02 62/50.5 |
| 2013/0263609 A1 | 10/2013 | Mackey | | |
| 2013/0327421 A1 | 12/2013 | Chang et al. | | |
| 2016/0370036 A1 * | 12/2016 | Herzog | ................ | F17C 13/007 |
| 2017/0108170 A1 * | 4/2017 | Gustafson | ............... | F17C 7/04 |
| 2018/0306383 A1 * | 10/2018 | Poag | ...................... | F17C 7/04 |

FOREIGN PATENT DOCUMENTS

| | | |
|---|---|---|
| EP | 1659355 A2 | 5/2006 |
| EP | 2384916 A1 | 11/2011 |
| GB | 2275098 A | 8/1994 |
| WO | WO 2011141287 A1 | 11/2011 |
| WO | WO 2014064355 A2 | 5/2014 |

* cited by examiner

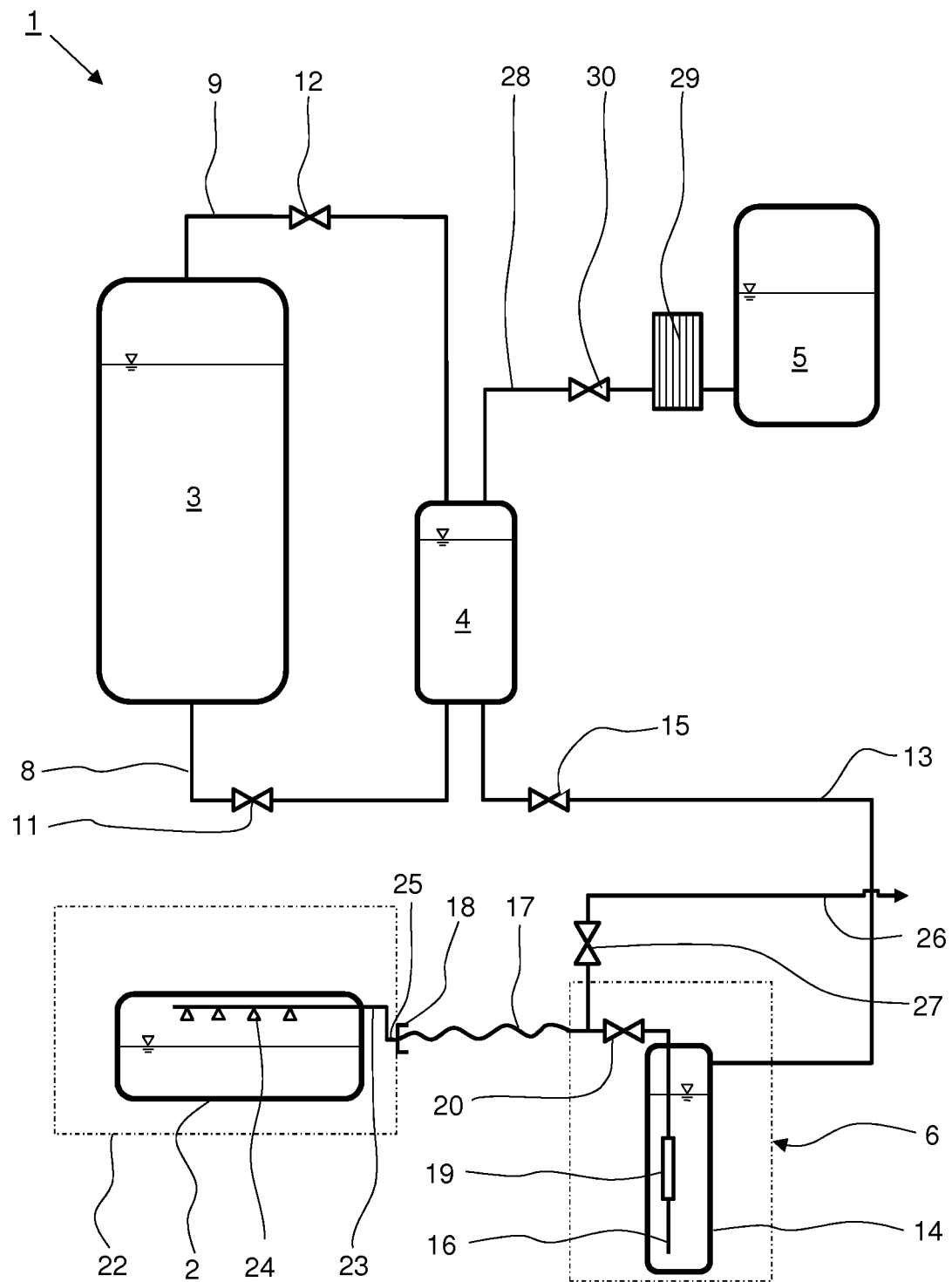

DEVICE AND PROCESS FOR FILLING A MOBILE REFRIGERANT TANK WITH A CRYOGENIC REFRIGERANT

CROSS-REFERENCE TO RELATED APPLICATIONS

This application is the U.S. national stage application of International Application PCT/EP2018/071282, filed Aug. 6, 2018, which international application was published on Mar. 7, 2019, as International Publication WO 2019/042714 in the German language. The international application is incorporated herein by reference, in entirety. The international application claims priority to German Patent Application No. 10 2017 008 210.3, filed Aug. 31, 2017, which is incorporated herein by reference, in entirety.

FIELD

The invention concerns a device for filling a refrigerant tank of a vehicle with a cryogenic refrigerant, with a storage tank for storing liquefied cryogenic refrigerant which is fluidically connected to a filling station comprising a filling line equipped with a coupling for connecting a refrigerant tank to be filled. The invention furthermore concerns a corresponding method.

BACKGROUND

In particular, the invention relates to a device or method for filling refrigerant tanks which are intended for cooling a refrigerated space situated on a refrigerated vehicle, in particular a refrigerated truck. Such refrigerated spaces serve to transport temperature-sensitive goods as refrigerated products at a temperature from e.g. 4° C. to 10° C., or as frozen products at temperatures below 0° C. For cooling such refrigerated spaces, frequently conventional refrigeration apparatuses are used which however is increasingly being criticized in regular operation, firstly because of the high noise emissions and secondly the diesel emissions. An alternative is cooling by means of a cryogenic refrigerant. The cryogenic refrigerant, for example liquid nitrogen, is stored in liquid state in a thermally insulated refrigerant tank mounted on the vehicle, and supplied to the refrigerated space as required via a pipeline. To cool the refrigerated space, the cryogenic refrigerant is either sprayed into the refrigerated space in liquid or gaseous form (direct cooling) or is brought into indirect thermal contact with the atmosphere in the refrigerated space via a heat exchanger arrangement (indirect cooling). Examples of such refrigerated vehicles and cooling systems for refrigerated vehicles are described in WO 2011/141287 A1, EP 1 659 355 A2, GB 2 275 098 A, or EP 2 384 916 A2.

In addition however, the invention generally refers to a device and a method of the type cited initially for filling refrigerant tanks mounted on vehicles, in particular road or rail vehicles (referred to below as "mobile refrigerant tanks") with a cryogenic refrigerant.

Mobile refrigerant tanks are usually filled at filling stations which are fluidically connected to a stationary storage tank in which the refrigerant is stored in supercooled state. The filling station is equipped with a filling line to which a filling line of the refrigerant tank can be connected by means of a coupling.

To deliver the refrigerant to the filling station or to fill the refrigerant tank, normally a pump is used. However, delivering cryogenic refrigerants by means of a pump is associated with costs for operating and maintaining the pump, and in addition is susceptible to faults. Also, the pump delivers undesirable heat into the system. In order to avoid cavitation effects, the pump and line must also be precooled before the filling process, which leads to a substantial time delay.

In order to fill a mobile refrigerant tank without using a pump, the cryogenic refrigerant may be provided in the filling station at a higher pressure than the pressure in the refrigerant tank. When filling, the refrigerant flows into the refrigerant tank under the effect of the higher pressure. However, the problem arises that, when the pressure in the refrigerant tank is reduced to a lower pressure, part of the refrigerant is evaporated and must be discharged. This leads to substantial losses of refrigerant, and is also associated with significant safety risks for a user if the evaporated refrigerant is discharged into the surrounding atmosphere directly from the refrigerant tank or directly on the vehicle.

In a device known from WO 2014/064355 A2 for filling a refrigerant tank with a cryogenic medium, the gas occurring in the refrigerant tank is captured and used to create an even, predefined pressure difference between the storage tank of the filling station and the refrigerant tank. For this the gas is partly returned to the filling station. This indeed prevents the uncontrolled escape of cold gas to the environment, but leads to the necessity of providing a tight connection both between the liquid phases and between the gaseous phases in the refrigerant tank and in the storage tank. This is however awkward for a user, and not least increases the safety risk; also, the speed of the filling process is reduced.

There is a further problem with public filling stations for filling refrigerant tanks. Here, because of legal regulations, it must be ensured that a quantity of refrigerant measured out during filling is completely transferred to the customer's tank. This cannot however be guaranteed if the refrigerant partially evaporates in the customer's tank and is extracted therefrom during the filling process.

The invention is therefore based on the object of providing a rapid and secure method of filling mobile refrigerant tanks which meets the requirements for a public filling station.

SUMMARY

This object is achieved with a device of the type and purpose described initially, in that downstream of the storage tank and upstream of the filling station, a conditioning vessel is provided for temporary storage of liquefied cryogenic refrigerant, which vessel can be brought into fluidic connection with a pressure build-up vessel in which cryogenic refrigerant is present at a higher pressure than the pressure in the storage tank.

The terms "upstream" and "downstream" here and below refer to an arrangement relative to the intended flow direction of the liquid refrigerant during the filling process.

The device according to the invention thus comprises a preferably thermally insulated storage tank in which the cryogenic refrigerant, in particular liquid nitrogen, is stored at a comparatively low pressure $p_1$ of for example $p_1=1.2$ bar(g); an equally preferably thermally insulated pressure build-up vessel in which the cryogenic refrigerant is present at a pressure $p_2$ which is higher than the pressure $p_1$ in the storage tank, for example 5 to 8 bar(g); and a thermally insulated and pressure-resistant conditioning vessel which can be brought into fluidic connection with either the storage tank or alternatively the pressure build-up vessel. The conditioning vessel is smaller than the storage tank and the pressure build-up vessel, so that a change in the pressure conditions in the conditioning tank has substantially no influence on the pressure conditions in the storage tank and in the pressure build-up vessel. The conditioning vessel is fluidically connected to the filling line of a filling station which in turn may be connected, in pressure-resistant and fluid-tight but releasable fashion, by means of a coupling to a filling port of a refrigerant tank to be filled.

In the storage tank, the refrigerant is stored at comparatively low pressure and accordingly low temperature, and is filled in the conditioning vessel to a predefined level. After closing the fluidic connection to the storage tank and opening the fluidic connection to the pressure build-up vessel, because of the higher pressure prevailing there, a pressure rise occurs in the conditioning vessel, which causes the cryogenic refrigerant present there to assume a temperature which is significantly lower than the equilibrium temperature for the corresponding pressure; i.e. the cryogenic refrigerant in the conditioning vessel is in supercooled state and can be filled into the refrigerant tank via the filling line without a significant portion of the refrigerant evaporating during the filling process. According to the invention, no return line is required for returning gas from the headspace of the refrigerant tank to the filling station.

The storage tank and the conditioning vessel are preferably connected together via two lines: a first line by means of which liquid refrigerant is supplied from the storage tank to the conditioning vessel, and a second line by means of which the gaseous refrigerant is returned from the conditioning vessel to the headspace of the storage tank, and hence a pressure equilibrium can be achieved between the storage tank and the conditioning tank during filling of the conditioning tank. Both lines are equipped with shut-off fittings which are closed before creation of the fluidic connection of the conditioning vessel to the pressure build-up vessel.

The total quantity of refrigerant supplied to the refrigerant tank is preferably detected at a measuring device arranged in the filling line downstream of the conditioning vessel. Since the refrigerant tank is connected gas-tightly to the filling station during the filling process, and gas does not escape to the environment nor is it returned to the filling station or storage tank, the quantity detected at the measuring device very precisely reflects the actual quantity of refrigerant introduced into the refrigerant tank. In this way, the device according to the invention is in particular also suitable for installing in public filling stations for cryogenic refrigerant.

In a particularly advantageous embodiment of the invention, the pressure build-up vessel is designed for storage of liquefied cryogenic refrigerant and is equipped with an evaporator for evaporating cryogenic refrigerant. The refrigerant is therefore present in liquefied form in the pressure build-up vessel, and is fully or partially evaporated in order to create the pressure acting on the conditioning vessel. The evaporation preferably takes place by means of an air evaporator in which the liquid cryogenic refrigerant is brought into thermal contact with the warmer surrounding air.

Preferably, the filling line is fluidically connected upstream of the coupling to a closable exhaust gas line for purging the refrigerant tank. The exhaust gas line is arranged inside the filling station and allows the dissipation of gaseous refrigerant from the refrigerant tank. In this case, the portions of the filling line between the refrigerant tank and coupling, and between the coupling and the branch of the exhaust gas line, serve thus both to supply liquid cryogenic medium to the refrigerant tank and to discharge gaseous refrigerant from the refrigerant tank before the start of the filling thereof with liquid refrigerant. It is thus not necessary to provide a separate line for discharging the gaseous phase from the refrigerant tank.

Suitably, a plurality of conditioning vessels is provided which can be brought into fluidic connection with either the storage tank and/or the pressure build-up vessel by means of suitable shut-off fittings, which may be remote-controlled for example by means of a control unit, each conditioning vessel being connected to a filling station. In this way, several filling processes can be carried out simultaneously with one storage tank and one pressure build-up vessel.

The cryogenic refrigerant is preferably liquefied nitrogen, liquefied hydrogen or a liquefied hydrocarbon gas, such as LNG or LPG.

A refrigerant tank which is suitable for filling by means of the device according to the invention comprises a filling line which can be connected to the coupling of the filling station and opens into the refrigerant tank, wherein the filling line opens into an upper region of the refrigerant tank at a nozzle arrangement. During the filling process, liquefied supercooled refrigerant is sprayed—preferably continuously—into a gaseous phase present in the upper region of the refrigerant tank, in supercooled state under the pressure conditions prevailing in the refrigerant tank. In this way, the gaseous phase present in the refrigerant tank is cooled and the pressure in the refrigerant tank is reduced. Depending on the temperature conditions, the gas may even partially condense out. The refrigerant tank here requires no line separate from the filling line for discharging gaseous refrigerant.

The object of the invention is also achieved with a method with the features of claim 7.

The filling method according to the invention for filling a refrigerant tank of a refrigerated vehicle with a cryogenic refrigerant is characterized by the following steps:

a. a liquefied cryogenic refrigerant stored at a pressure $p_1$ in a storage tank is supplied to a conditioning vessel, b. the fluidic connection between the storage tank and the conditioning vessel is then interrupted, and the pressure in the conditioning vessel is brought isothermically to a pressure $p_2$ which is greater than the pressure $p_1$ in the storage tank, c. the refrigerant tank to be filled is pressure-relieved to a pressure which is lower than the pressure $p_2$ in the conditioning vessel, d. a fluidic connection is created between a liquid phase of the cryogenic refrigerant present in the conditioning vessel and the refrigerant tank to be filled, and the refrigerant tank is then filled under the positive pressure of the cryogenic refrigerant present in the conditioning tank.

To fill the conditioning vessel, either the starting pressure in the storage tank is higher than that in the conditioning tank, so that the conditioning tank can be filled to a predefined level under the effect of the positive pressure prevailing in the storage tank. In this case, on filling of the conditioning tank, the refrigerant expands and is present there at a lower temperature than in the storage tank. Or the storage tank and the conditioning tank are connected both at the liquid phases present therein and at the gaseous phases, and have a substantially equal pressure and equal temperature.

After interruption of the fluidic connection to the storage tank, the pressure in the conditioning vessel is brought under at least largely isothermic conditions, i.e. without a substantial increase in the temperature of the cryogenic refrigerant in the conditioning vessel, to a value $p_2$, wherein $p_2>p_1$. The liquefied refrigerant present in the conditioning tank is thus supercooled; this avoids part of the refrigerant evaporating during its supply to the refrigerant tank. At the same time, the refrigerant in the conditioning tank is thereby brought to a pressure which allows filling of a refrigerant tank without the aid of a pump. For this, the atmosphere in the refrigerant tank to be filled must be reduced to a correspondingly lower pressure value (p<$p_2$) before the start of the filling process, if a higher pressure prevails therein.

After completion of filling, the fluidic connection from the refrigerant tank to the conditioning vessel is interrupted and the coupling parts are separated. Then the refrigerated vehicle can leave the filling station. Also, the fluidic connection between the pressure build-up vessel and the conditioning vessel is closed, and the pressure in the conditioning vessel is relieved, e.g. via a gas return line which connects an upper region of the conditioning vessel to an upper region of the storage tank. The conditioning vessel is then available for refilling.

The above-mentioned increase in pressure in the conditioning vessel preferably takes place in that, after interruption of the fluidic connection to the storage vessel, a fluidic connection is created to a pressure build-up vessel in which a higher pressure prevails than in the storage tank. The pressure build-up vessel is for this preferably filled with the same cryogenic refrigerant as the storage tank, which is stored in liquid state in the pressure build-up vessel and at least partially evaporated before creation of the fluidic connection to the conditioning tank.

Suitably, the atmosphere in the refrigerant tank before the start of filling is pressure-relieved to a pressure between 0 bar(g) (i.e. ambient pressure) and 2 bar(g). Preferably, this is achieved in that part of the gaseous phase present in the refrigerant tank is supplied via the same filling line which supplies the refrigerant to the refrigerant tank (step d), which is thereby also precooled.

In order to cool the gaseous phase present in the refrigerant tank and accordingly reduce the pressure in the refrigerant tank, preferably the liquid cryogenic refrigerant is sprayed into a gaseous phase present in the refrigerant tank via a nozzle arrangement.

Preferably, before or during filling, the pressure $p_1$ in the storage tank lies between 1 bar(g) and 2 bar(g), and the pressure $p_2$ in the conditioning vessel—after the pressure rise—lies between 5 bar(g) and 10 bar(g). In the case that the pressure rise in the conditioning vessel takes place by creation of a fluidic connection to a pressure build-up vessel, the cryogenic refrigerant therein is preferably present at a pressure which also lies between 5 bar(g) and 10 bar(g).

The device according to the invention and the method according to the invention are particularly suitable for filling refrigerant tanks with liquid nitrogen, but also for filling refrigerant tanks with liquid hydrogen or a liquefied hydrocarbon gas, e.g. LNG or LPG. The refrigerant tank is preferably a tank which is mounted on or to a land-based vehicle, for example a truck.

BRIEF DESCRIPTION OF THE DRAWING

An exemplary embodiment of the invention is now described in more detail with reference to the drawing. The only drawing (FIG. 1) shows diagrammatically the structure of a device according to the invention.

DETAILED DESCRIPTION

The device 1 for filling a mobile refrigerant tank 2 with a liquefied cryogenic refrigerant comprises a storage tank 3, a conditioning vessel 4, a pressure build-up vessel 5 and a filling station 6. For example, the storage tank 3 has a storage capacity of 20,000 to 50,000 liters, the pressure build-up container 5 has a capacity of 5000 to 10,000 liters, and the conditioning vessel has a capacity of 1000 to 2000 liters, i.e. less than one tenth of the capacity of the storage tank. The storage tank 3, conditioning tank 4 and pressure build-up vessel 5—like the lines connecting them and departing therefrom—are thermally well-insulated.

A liquid supply line 8 leads from the floor of the storage tank 3 to the conditioning vessel 4. A gas return line 9 connects the upper regions of the storage tank 3 and the conditioning vessel 4. The liquid supply line 8 and gas return line 9 may be blocked and opened by actuation of valves 11, 12.

A liquid supply line 13 leads from the floor of the conditioning vessel 4 to an intermediate vessel 14, acting as a phase separator, in the filling station 6, wherein again here a valve 15 allows blocking or opening of the liquid supply line 13. From a lower region of the intermediate vessel 14, a filling line 16 having a flexible line portion 17 leads to a coupling port 18. To detect the flow through the liquid supply line 13, a suitable measuring device 19, e.g. a measuring orifice, is provided here. The filling line 16 can be blocked or opened by means of a valve 20. The filling station 6 is constructed as a dispenser and, in the manner described in more detail below, allows filling of a refrigerant tank 2 which is situated on a refrigerated vehicle 22, here merely indicated by a dotted line. The refrigerant tank 2 serves for cooling a refrigerated space (not shown here) on the refrigerated vehicle 22, for example a refrigerated space for transporting refrigerated and/or frozen foodstuffs On the refrigerated vehicle 22, a filling line 23 leads from a coupling piece 25—which can be connected fixedly but releasably to the coupling port 18—to the refrigerant tank 2, into which it opens in an upper region at a nozzle arrangement 24 consisting of several spray nozzles.

An exhaust gas line 26 branches off the filling line 16, fluidically between the coupling port 18 and the measuring device 19, and can be blocked or opened by means of a valve 27. In a manner not shown here, the exhaust gas line 26 opens into a catchment vessel, a return line or a gas outlet at which gas is emitted to the surrounding atmosphere.

From an upper region of the conditioning vessel 4, a pressurized gas line 28 leads to the pressure build-up container 5. An evaporator 29, in particular an air evaporator, is arranged in the pressurized gas line 28. The pressurized gas line 28 can be blocked or opened by means of a valve 30 which, like all other valves cited above, can be actuated manually or by means of a remote-controlled motor.

In operation of the device 1, a liquid cryogenic refrigerant, e.g. liquid nitrogen, is stored in the storage tank 3 at a pressure of for example 1 bar(g) to 2 bar(g). By opening the valve 11 while keeping valve 12 open, the conditioning vessel 4 is filled to a predefined level. The valves 15 and 30 remain closed during this process.

Before filling the refrigerant tank 2, the flexible line portion 17 of the filling line 16 is connected at the coupling port 18 to the coupling piece 25 of the filling line 23. Valve 20 is closed. Valve 27 is then opened and gas is dissipated from a gaseous phase present in refrigerant tank 2 via the exhaust gas line 26, until a predefined pressure value of for example 0 bar(g) to 2 bar(g) is reached in the refrigerant tank 2. The valve 27 is then closed. The flow of cold gas through the filling line 23 and the line portion 17 precools these for the subsequent filling of the refrigerant tank 2.

At approximately the same time as the gas is discharged from the refrigerant tank 2, the valves 11, 12 are closed and valve 30 opened. Liquid refrigerant flows out of the pressure build-up vessel 5, in which the cryogenic refrigerant is present at a pressure for example of between 5 bar(g) and 8 bar(g), is evaporated in the evaporator 29 and flows into the headspace of the conditioning vessel 4 as gas. The associated pressure rise in the conditioning vessel 4 means that the liquid refrigerant present there is now present in supercooled form, i.e. at a substantially lower temperature than the equilibrium temperature for a pressure of 5 bar(g) to 8 bar(g). The valve 15 is then opened, whereby liquid refrigerant flows out of the conditioning vessel 4 via the liquid supply line 13 into the intermediate vessel 14, and there forms a liquid phase in which the end of the filling line 16 opposite the coupling port 18 is immersed.

Valve 20 is then opened. The liquid refrigerant, still in the supercooled state, flows via the filling line 16 and filling line 23 to the nozzle arrangement 24, and is sprayed into a gaseous phase present in the refrigerant tank 2. By contact of the cold liquid with the comparatively warm gas in the refrigerant tank 2, the gaseous phase present there is cooled and partially condensed into liquid refrigerant, whereby the pressure in the refrigerant tank is reduced.

Complete filling of the refrigerant tank 2 is established by a pressure rise in the filling line 23, which is measured by means of a measuring device (not shown here). After completion of the filling process, valves 20, 30 are closed. The coupling piece 25 can now be detached from the coupling port 18. By opening the valve 12, the pressure is balanced between the storage tank 3 and the conditioning vessel 4, which can now be filled again with liquid refrigerant from the storage tank 3 at the low pressure prevailing there.

The filling process according to the method of the present invention is performed completely without intermediate purging of the refrigerant tank 2 to be filled. This not only minimizes the refrigerant consumption and fulfils the requirements for a public filling station, but the filling process can also take place very quickly. For example, a tank with a capacity of 660 liters can be filled with liquid nitrogen within 6 to 8 minutes. Also, the arrangement according to the invention requires no separate coupling for connection of a gas return line from the refrigerant tank 2, thus guaranteeing a high level of user-friendliness and safety.

LIST OF REFERENCE SIGNS

1 Device
2 Refrigerant tank
3 Storage tank
4 Conditioning vessel
5 Pressure build-up vessel
6 Filling station
7 -
8 Liquid supply line
9 Gas return line
10 -
11 Valve
12 Valve
13 Liquid supply line
14 Intermediate vessel
15 Valve
16 Filling line
17 Flexible line portion
18 Coupling port
19 Measuring device
20 Valve
21 -
22 Refrigerated vehicle
23 Filling line
24 Nozzle arrangement
25 Coupling piece
26 Exhaust gas line
27 Valve
28 Pressurized gas line
29 Evaporator
30 Valve

The invention claimed is:

1. A device for filling a refrigerant tank of a vehicle with a cryogenic refrigerant, with a storage tank for storing liquefied cryogenic refrigerant, which is fluidically connected to a filling station comprising an intermediate liquid retaining vessel and a filling line equipped with a coupling for connection of a refrigerant tank to be filled, wherein downstream of the storage tank and upstream of the filling station, a conditioning vessel is provided for temporary storage of liquefied cryogenic refrigerant, which conditioning vessel is configured to be brought into fluidic connection with a pressure build-up vessel in which cryogenic refrigerant is present at a higher pressure than the pressure in the storage tank.

2. The device as claimed in claim 1, wherein the pressure build-up vessel is equipped with an air evaporator for evaporating cryogenic refrigerant.

3. The device as claimed in claim 1, wherein the filling line is fluidically connected, upstream of the coupling, to a closable exhaust gas line for purging the refrigerant tank.

4. The device as claimed in claim 1, wherein the cryogenic refrigerant is liquefied nitrogen, liquefied hydrogen, or a liquefied hydrocarbon gas.

5. A refrigerant tank which is configured to be filled by means of a device as claimed in claim 1, wherein a filling line, which is configured to be connected on the tank side to the coupling, opens into an upper region of the refrigerant tank at a nozzle arrangement.

6. The device as claimed in claim 1, wherein the intermediate liquid retaining vessel is positioned downstream of the conditioning vessel and upstream of the refrigerant tank.

7. The device as claimed in claim 6, wherein the intermediate liquid retaining vessel is fluidically coupled to the conditioning vessel and is configured to act as a phase separator.

8. A method for filling a refrigerant tank of a vehicle with a cryogenic refrigerant, in which:
    a. a liquefied cryogenic refrigerant stored at a pressure $p_1$ in a storage tank is supplied to a conditioning vessel and there forms a liquid phase;
    b. a fluidic connection between the storage tank and the conditioning vessel is interrupted, and the pressure in the conditioning vessel is brought isothermically to a pressure $p_2$ which is greater than the pressure $p_1$ in the storage tank;
    c. a refrigerant tank to be filled is pressure-relieved to a pressure which is lower than the pressure in the conditioning vessel;
    d. a fluidic connection is created between the liquid phase of the cryogenic refrigerant present in the conditioning vessel and the refrigerant tank to be filled, and the refrigerant tank is filled under the positive pressure of the cryogenic refrigerant present in the conditioning vessel;

wherein the cryogenic refrigerant is configured to pass through an intermediate vessel prior to being dispensed into the refrigerant tank.

9. The method as claimed in claim 8, wherein to raise the pressure in the conditioning vessel isothermically (step b), a fluidic connection is created between the conditioning vessel and a pressure build-up vessel in which gaseous cryogenic refrigerant is present at the pressure $p_2$ which is greater than the pressure $p_1$ in the storage tank.

10. The method as claimed in claim 9, wherein the pressure $p_1$ in the storage tank is between 1 bar(g) and 2 bar(g), and the pressure $p_2$ in at least one of the conditioning vessel and the pressure build-up vessel is between 5 bar(g) and 10 bar(g).

11. The method as claimed in claim 8, wherein before the fluidic connection is created between the liquid phase present in the conditioning vessel and the refrigerant tank to be filled, the latter is brought to a pressure between 0 bar(g) and 2 bar(g).

12. The method as claimed in claim 8, wherein after the fluidic connection has been created between the conditioning vessel and the refrigerant tank, the cryogenic refrigerant is sprayed into a gaseous phase present in the refrigerant tank.

13. The method as claimed in claim 8, wherein the intermediate vessel is positioned downstream of the conditioning vessel and upstream of the refrigerant tank.

14. The method as claimed in claim 13, wherein the intermediate vessel is fluidically coupled to the conditioning vessel and is configured to act as a phase separator.

15. A device for filling a refrigerant tank with a cryogenic refrigerant, the device comprising:
   a storage tank configured to store a liquified cryogenic refrigerant;
   a conditioning vessel provided for temporary storage of the liquified cryogenic refrigerant;
   a pressure build-up vessel configured to be brought into fluidic connection with the conditioning vessel;
   a filling station, wherein the filling station is fluidically connected to the storage tank and comprises:
      an intermediate vessel for temporary storage of the liquified cryogenic refrigerant; and
      a filling line;
   wherein the filling line includes a coupling which is configured to connect to a refrigerant tank; and
   wherein the conditioning vessel is provided downstream of the storage tank and upstream of the filling station.

16. The device as claimed in claim 15, wherein the intermediate vessel is fluidically coupled to the conditioning vessel and is configured to act as a phase separator.

* * * * *